United States Patent [19]

Busch

[11] 4,375,919
[45] Mar. 8, 1983

[54] MULTIPLE ENTRANCE APERTURE DISPERSIVE OPTICAL SPECTROMETER

[75] Inventor: Kenneth W. Busch, Waco, Tex.

[73] Assignee: Baylor University, Waco, Tex.

[21] Appl. No.: 195,210

[22] Filed: Oct. 7, 1980

Related U.S. Application Data

[63] Continuation of Ser. No. 33,235, Apr. 25, 1979, abandoned.

[51] Int. Cl.³ ............................ G01J 3/18; G01J 3/28
[52] U.S. Cl. ..................................... 356/326; 356/328
[58] Field of Search ................. 356/51, 310, 326, 328, 356/330, 332, 334, 305, 307, 313, 311

[56] References Cited

U.S. PATENT DOCUMENTS

| | | | |
|---|---|---|---|
| 2,823,577 | 2/1958 | Machler | 356/326 X |
| 2,975,669 | 3/1961 | Jarrell et al. | 356/305 |
| 3,247,759 | 4/1966 | Saunderson | 356/313 X |
| 3,519,816 | 7/1970 | Bartz et al. | 356/51 X |
| 3,554,649 | 1/1971 | Ridgway | 356/334 |
| 3,728,029 | 4/1973 | Hirschfeld | 356/326 X |
| 3,837,744 | 9/1974 | Egan et al. | 356/310 |
| 3,880,523 | 4/1975 | Thomas | 356/328 X |
| 4,012,147 | 3/1977 | Walrafen | 356/326 |
| 4,022,531 | 5/1977 | Orazio et al. | 356/332 |
| 4,054,389 | 10/1977 | Owen | 356/332 X |
| 4,259,014 | 3/1981 | Talmi | 356/328 |

FOREIGN PATENT DOCUMENTS 1103320  2/1968  United Kingdom ............... 356/307

OTHER PUBLICATIONS van der Piepen et al., Spectrochimica Acta, vol. 31 B, No. 7, 1976, pp. 389–398.
Meyling et al., Journal of Physics E: Scientific Instruments, May 1977, vol. 10, No. 5, pp. 438–440.
Loseke et al., Applied Spectroscopy, vol. 25, No. 1, 1971, pp. 64–70.

Primary Examiner—F. L. Evans
Attorney, Agent, or Firm—Kenway & Jenney

[57] ABSTRACT

A dispersive optical spectrometer is disclosed which comprises light detection means, dispersion means for separating light radiation into spectral components and for directing the spectral components toward the light detection means, means for admitting light radiation into the entrance focal plane and for directing the light radiation toward the dispersion means, the light radiation admitting means including a plurality of spaced-apart apertures, and light transmission means for transmitting light radiation from a light source to one or more of the apertures.

7 Claims, 6 Drawing Figures

MULTIPLE ENTRANCE APERTURE DISPERSIVE OPTICAL SPECTROMETER

This is a continuation of application Ser. No. 033,235 filed Apr. 25, 1979, now abandoned.

BACKGROUND OF THE INVENTION

The present invention relates to spectrometer apparatus for separating light radiation into a plurality of spectral bands and, more particularly, to a dispersive optical spectrometer for efficiently dispersing spectral radiation for performing multielement spectral analysis.

Optical spectrometers have been known for quite some time. These devices are based on a dispersive element, which may be a prism or a diffraction grating, such as a plane or concave diffraction grating. A typical conventional optical arrangement, such as an Ebert or Czerny-Turner mounting, is comprised of the following components: (1) a single entrance aperture to admit radiation, (2) a collimating component to render the admitted radiation into a parallel bundle of rays, (3) a dispersion device such as a prism or diffraction grating, (4) a focusing component to focus the dispersed radiation as images along the plane known as the focal plane, and (5) detection means upon which the dispersed spectrum is focused and which is some manner transduces the optical information striking it into some usable form. In systems which employ a concave diffraction grating, the collimating and focusing components are unnecessary.

Various types of detectors may be used, such as, for example, film, photodiode circuits or optoelectronic multichannel vidicon detectors. One such vidicon may be an optical multichannel analyzer (OMA) coupled with a silicon intensified target (SIT) detector described in catalog number T388-15M-5/78-CP published by Princeton Applied Research Corp., Princeton, N.J.

These dispersive optical spectrometers employ a single entrance aperture so that the spectral information is dispersed in the exit focal plane as a single band of radiation along a single direction of dispersion, for example a single horizontal band of radiation. With this arrangement, the position of the various radiational components along the focal plane defines the wave length of the various radiational components which may be present.

This optical arrangement is perfectly satisfactory for use with photographic detection because the photographic plates may be fabricated in lengths sufficient to cover the spectral region of interest, from the ultraviolet to the near infrared. The advent of optoelectronic detectors, such as the vidicon and other electronic image detectors, has demonstrated that these devices offer some distinct advantages for the spatial detection of dispersed radiation. Their major limitation at present seems to be the limited amount of dispersed spectral information which can be simultaneously imaged on the image or light detector. When such detectors are used with a conventional dispersive spectrometer as described above, only a limited spectral region can be accessed by the image detector simultaneously. This limited spectral region, or window, is defined by:

$$W = R_d D \qquad (1)$$

where W is the extent of spectral region or the window width, $R_d$ is the reciprocal linear dispersion of the spectrometer and D is the diameter of the light sensitive face plate of the image tube. Thus the window width may be increased by either increasing $R_d$ or D. Because of the nature of the image detectors, the prospect for increasing D is remote. If $R_d$ is increased, by changing the focal length of the collimator/focusing elements or by employing a more coarsely ruled diffraction grating, more spectral information may be compressed across the face plate of the image detector. However, this modification results in poorer resolution.

The resolution of the system determines how close any two spectral components may be and still be recognized as separate, distinct spectral components. Thus, the use of an image detector with a conventional single aperture dispersive spectrometer results in a compromise between window widths and resolution. For atomic spectroscopy one should ideally cover the entire spectral region of interest from the ultraviolet to the near infrared at high resolution to cover the maximum spectral region under conditions where as many as possible of these spectral components are recognizable as distinct, separate spectral components which do not overlap adjacent spectral components.

To overcome this limitation of conventional one-dimensional dispersive systems, an optical arrangement known as an echelle system has been employed in conjunction with image detectors. Such systems use a specially, more coarsely ruled grating, known as an echelle grating, in order to provide high dispersion. In addition to the echelle grating, another dispersing device such as a prism is arranged to disperse the radiation orthogonal to the direction of dispersion of the echelle grating. Such a crossed dispersion optical arrangement results in a two-dimensional array of spectral information because the prism disperses all the various diffraction orders produced by the echelle grating. This system, however, employes complex optics and does not display the spectrum in parallel bands. Furthermore, the bands are non-uniform in size which makes detection difficult and inefficient since large portions of the target are not utilized. Also, separation between parallel bands is not uniform. Resolution also varies across the spectrum in this type of system. In order to utilize the optoelectronic detector apparatus, the nonparallel display of bands calls for a complex computer controlled detector system and constitutes an inherently inefficient use of the two-dimensional vidicon target. This system also is notorious for its high stray light levels, a direct result of the optical design and configuration.

SUMMARY OF THE INVENTION

It is, accordingly, an objective of this invention to provide an apparatus for separating light radiation into its component spectral bands in such a way that the dispersed radiational components may be more efficiently arranged and focused on an image detector than has heretofore been accomplished with conventional one-dimensional dispersive optical spectrometers.

It is another objective of this invention to provide an apparatus for separating light radiation into its component spectral bands which has greater operational flexibility to permit various adjustments tailored to the particular analysis being performed in order to obtain more accurate information.

Additional objectives and advantages of the invention will be set forth in part in the description which follows, and in part will be apparent from the description, or may be learned by practice of the invention.

The objectives and advantages of the invention may be realized and attained by means of the instrumentalities and combinations particularly pointed out in the appended claims.

To achieve the foregoing objectives, and in accordance with the purpose of the invention, as embodied and broadly described herein, there is provided a dispersive optical spectrometer comprising radiation detection means, dispersion means for separating radiation into spectral components and for directing the spectral components toward the detection means, means for admitting radiation into an entrance focal plane and for directing the radiation toward the dispersion means, the radiation admitting means including a plurality of spaced apart apertures, and transmission means for transmitting radiation from a radiation source to one or more of the apertures.

Further, the plurality of apertures of the light radiation admitting means may be spaced apart in a direction parallel to the direction of dispersion of the dispersion means. The dispersive optical spectrometer may also include means for rendering selected ones of the aperture's opaque; or means for varying the size of at least one of the apertures or filter means optically operative with the light transmission means to modify the effect of at least a portion of the light radiation or any combination of these means. It is also contemplated that the light transmission means may comprise at least one fiber optic light guide.

BRIEF DESCRIPTION OF THE DRAWINGS

The accompanying drawings, which are incorporated in and constitute a part of this specification, illustrate embodiments of the invention and, together with the description, serve to explain the principles of the invention.

In the drawings.

DETAILED DESCRIPTION OF PREFERRED EMBODIMENTS

Reference will now be made in detail to preferred embodiments of the invention, which are illustrated in the accompanying drawings.

Figure 1:
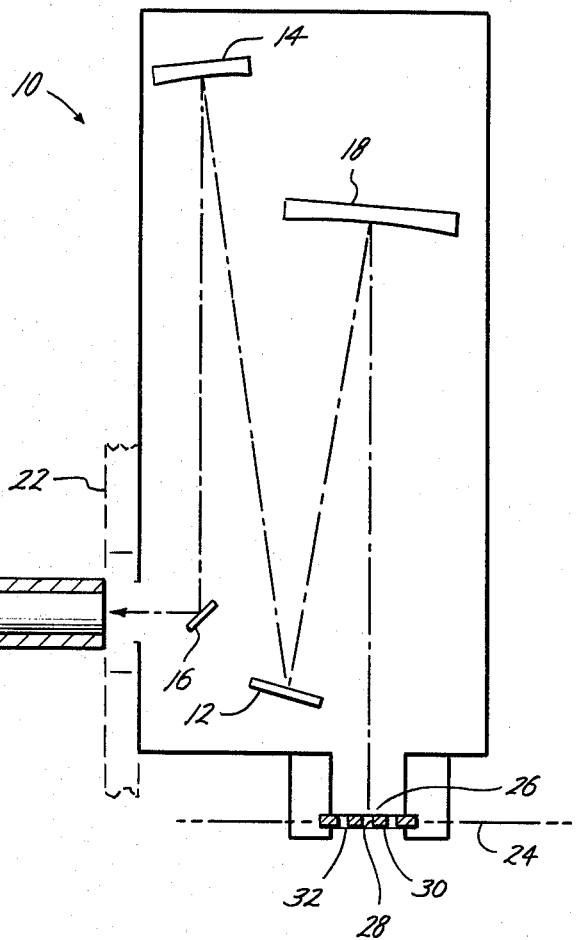
FIG. 1 is a plan view of one embodiment of a dispersive optical spectrometer constructed in accordance with the teachings of this invention.

Referring to the drawings, and more particularly to FIG. 1, there is illustrated a dispersive optical spectrometer 10 formed in accordance with this invention. The spectrometer 10 includes conventional optical elements including dispersion means, such as a diffraction grating 12, means for directing the spectral components emanating from the diffraction grating 12, such as a focusing mirror 14, a direction mirror 16 and means, such as mirror 18, for collimating and directing admitted light radiation toward the diffraction grating 12.

Light detection means 20 is mounted in the spectrometer exit focal plane 22. The light detection means can be any image or array detector such as photosensitive film, a photodiode circuit, a rear illuminated screen or the target of an optoelectronic detector coupled to an optical multichannel analyzer. The latter may be, for example, of the type previously noted as described in Princeton Applied Research Corporation catalog number T388-15-M-5/78-CP. The analyzer is connected to a display device such as an oscilloscope which provides a visual readout in the form of, for example, a display of radiation intensity vs. wavelength, to enable multielement analysis.

In accordance with this invention, there is also provided means for admitting light radiation to the entrance focal plane 24 and for directing the light radiation toward the dispersion means. As embodied herein the means 26 for admitting light radiation into the entrance focal plane 24 includes a plurality of spaced apart apertures 28 which can be formed in a multiple entrance aperture assembly 30 mounted in the entrance port 32 of the optical spectrometer 10.

Figure 2:
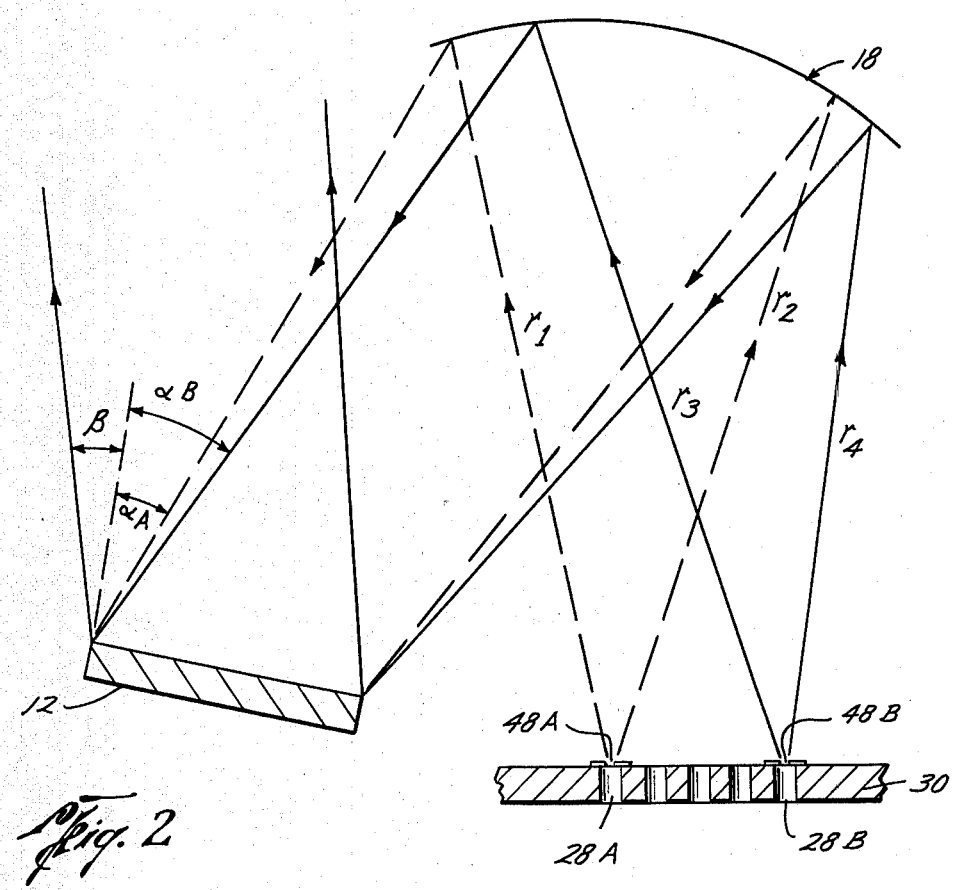
FIG. 2 is a schematic illustration of the path of light radiation from the multiple entrance aperture assembly to the dispersion means.

The use of a series of multiple entrance apertures 28 is capable of providing composite wide band spectrum information. Each entrance aperture 28 will admit light independently of the others and each will independently satisfy the well-known grating equation.

$$m\lambda = d(\sin \alpha \pm \sin \beta) \quad (2)$$

where m is the diffraction order, $\lambda$ is the wave length of dispersed radiation, d is the grating spacing, $\alpha$ is the angle of incidence measured with respect to the grating normal and $\beta$ is the angle of diffraction with respect to the grating normal. The angle $\beta$ determines the position of focus for a given spectral component of wave length $\lambda$ for a given angle of incidence $\alpha$ in the first order. When multiple entrance apertures are employed, it is clear from the above equation that for a given angle $\beta$ each entrance aperture will independently satisfy the equation. Since each aperture occurs at a different position in the entrance focal plane 24, the corresponding radiation from each aperture will have a different angle of incidence $\alpha$ with the grating 12 as is shown in FIG. 2. The grating 12 of course separates the incident radiation into spectral components or bands and the focusing mirror 14 focuses the spectral band covering a defined spectral window onto the light detection means 20.

Thus each entrance aperture 28 will independently focus its own spectrum onto the light sensitive portion or target of the light detection means 20 and each spectrum will be displaced from the others in accordance with the above equation (2) by the displacement of the entrance apertures in the entrance focal plane 24. When the multiple entrance apertures are arranged in a direction parallel to the direction of dispersion of the dispersion means or grating 12, such as horizontally, and when several apertures are employed simultaneously, a series of overlapping spectra are imaged on the light sensitive surface of the light detection means 20. With this arrangement, the resolution achievable depends upon the grating characteristics and the resolution (modulation transfer function) of the light detection means, but not on the displacement between adjacent entrance apertures 28. In this way, the resolution achieved is not limited by how closely the adjacent entrance apertures may be placed with respect to one another.

Figure 3:
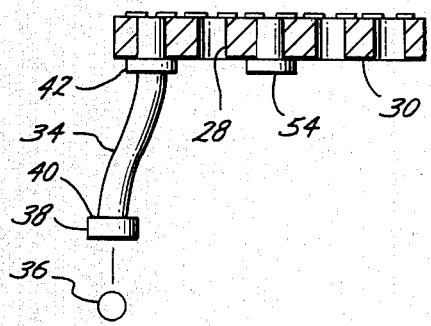
FIG. 3 is a schematic plan view of the multiple entrance aperture assembly of FIG. 2 and further illustrating a light source and light transmission means.

Further, in accordance with the invention, and as shown in FIG. 3, light transmission means 34 are provided to transmit light radiation from a light source 36 to one or more of the apertures 28. Due to the optical difficulties presented when illuminating multiple entrance apertures simultaneously from a single course, fiber optic light guides 34 satisfactorily convey the light radiation from the light source 36 to the individual apertures 28. While the use of fiber optic light guides is convenient, their use is not essential to the multiple aperture concept as other optical arrangements, which could accomplish this light transmission, are possible.

In order to improve the light gathering ability of each fiber optic light guide 34, a light-collecting (input) lens 38 can be fitted onto the input end 40 of each light guide 34. The use of fiber optic light guides also permits greater flexibility of use and tailoring of the spectrometer 10 to the particular needs at the moment. For example, the use of individual fiber optic light guides permits individual adjustment to examine major, minor and trace elements in the multielement specimen being examined. Intense emission radiation striking the detection means 20 may be attenuated or avoided through the use of variable neutral density filters or narrow band pass filters 42 which may be employed with a particular fiber optic guide 34 without simultaneously attenuating the intensities for all elements.

Figure 4:
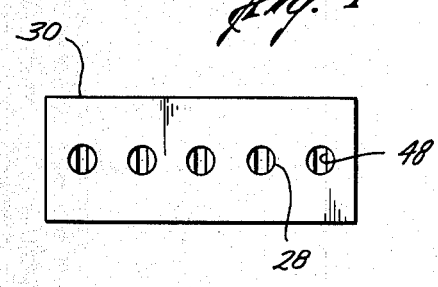
FIG. 4 is a schematic front view of a multiple entrance aperture assembly for admitting light radiation to the optical spectrometer of FIG. 1.
Figure 5:
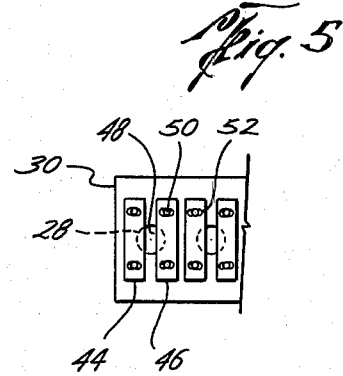
FIG. 5 is a schematic rear view of the multiple entrance aperture assembly of FIG. 4.

Further in accordance with the invention, the multiple entrance aperture assembly 30 may also include means for varying the size of the apertures 28. As here embodied, and as shown in FIGS. 4 and 5, the apertures may be masked from behind the aperture assembly 30 by a light shutter formed of a pair of plates 44, 46 which together form an entrance slit 48 of the desired width. While the width dimension may vary depending upon the particular spectrometer and the use to which it will be put, it has been found that typically the slit width can be from approximately 10 micrometers to approximately 1 millimeter. The plates 44, 46 may include means for enabling adjustment of the slit width, such as slots 50 which, together with fastening means, for example bolts 52, permit adjustment of the dimensions of the slit 48.

One reason for varying the slit width would be to attenuate or otherwise modify the emission radiation striking the light detection means or to totally render the aperture 28 opaque. In situations where less than all of the apertures are used simultaneously, other means can be utilized to render the apertures opaque, such as opaque plugs 54 which can be selectively inserted in the apertures as shown in FIG. 3.

Figure 6:
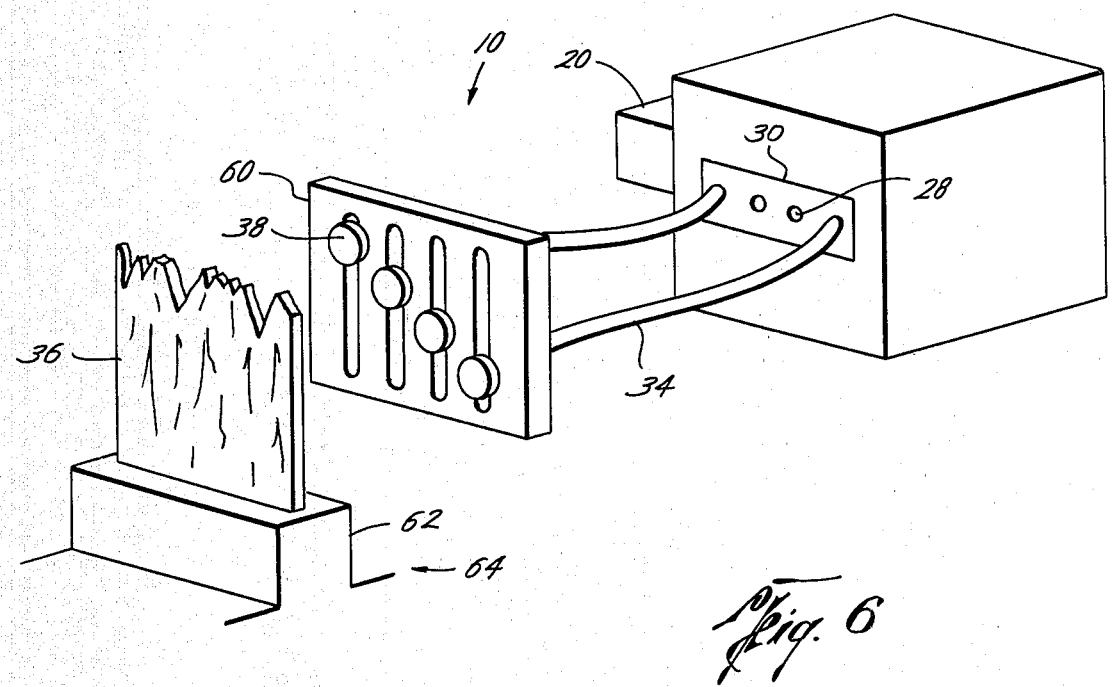
FIG. 6 is a schematic perspective illustration of a dispersive optical spectrometer constructed in accordance with the teachings of this invention.

In one particular illustrative embodiment, as shown in FIG. 6, a plurality of light collecting lenses 38 are mounted on a vertically slotted plate 60 adjacent to the burner head 62 of a flame excitation source 64. The input end of each of the fiber optic light guides 34 is fitted onto a lens 38. The other end, or exit end, of the light guide is adapted to be "plugged," like telephone jacks into a switchboard, into a multiple entrance aperture assembly 30. In one example, the apertures were 1.588 millimeters in diameter spaced on 4 millimeter centers and 29 horizontally aligned apertures were formed across a 12 centimeter entrance port. Each aperture was masked from behind to form an entrance slit 1.6 millimeters high and 100 micrometers wide. The vertical position of the multiple entrance aperture assembly 30 was adjusted to that height which produced a maximum signal at the light detection means 20.

The light detection means utilized consisted of a silicon intensified target (SIT) vidicon detector and an optical multichannel analyzer. The multichannel analyzer accumulated spectral information in 500 electronic channels and had two separate memories that permitted the storage of a data spectrum and a blank spectrum. An arithmetic unit permitted channel by channel subtraction of the memories.

The diffraction grating utilized produced a reciprocal linear dispersion of 3.2 nanometer/millimeter. Each separate entrance slit imaged a 40 nanometer spectral window on the 13 millimeter SIT detector face plate. Since the entrance slits 48 were placed over a 12 centimeter segment of the entrance focal plane, any wavelength within a range of 384 nanometers could be imaged on the detector. By employing several entrance slits simultaneously, widely separated spectral lines of interest were able to be simultaneously imaged on the detector with adequate resolution.

Mounting of the lenses 38 on the vertically slotted plate 60 permitted individual vertical adjustment of the lenses from 3 to 40 millimeters above the burner head 62 of the flame excitation source 64.

In operation of the embodiment illustrated in the drawings, light radiation from a light source 36 is transmitted to the multiple entrance aperture assembly 30 by the light guides 34. One or more light guides 34 are plugged into the appropriate number of apertures 28, the particular apertures used being determined by the particular analysis involved. Those apertures not in use are closed by plugs 54 or other suitable means.

The light radiation admitted to the apertures 28 at the spectrometer entrance focal plane 24 is directed toward the collimating mirror 18 and redirected toward the dispersion means 12 for separation into spectral components. As shown in FIG. 2, and referring to the endmost apertures 28A and 28B, the paths of radiation passing through the aperture slits 48A and 48B respectively are shown by the dotted lines $r_1-r_2$ and dashed lines $r_3-r_4$.

The light radiation impinging on the dispersion means or, in the embodiment illustrated, the diffraction grating 12, is separated into its spectral components in accordance with the angle at which the radiation is incident upon the diffraction grating. It is apparent in FIG. 2 that the radiation passing through slits 48A and 48B interacts with the diffraction grating 12 as different angles of incidence $\alpha_A$ and $\alpha_B$.

The radiation leaving the diffraction grating 12 is focused on the light detector 20 by the focusing mirror 14 and the direction mirror 16. The spectral components included in the radiation focused on the detector 20 from slit 48A will span a different range of wavelengths than the radiation focused on the detector 20 from the slit 48B. Each of the apertures 28 accounts for a particular spectral window.

Use of the fiber optics switchboard system as illustrated in FIG. 6 offers several important advantages for simultaneous multielement analysis by optical spectroscopy. Since a line of any given wavelength may be imaged on the light detection means 20 from any of several entrance slit positions, spectral lines may be moved across the light detection means target in such a way as to avoid potential spectral interferences as well as regions of intense, unwanted background which could result in detector saturation and blooming.

In addition, analytical lines may be selected on the basis of spectrochemical considerations, since any line within a 384 nanometer region may be accessed. Thus, in contrast to earlier one-dimensional systems, primary resonance lines normally used in analytical work may be employed rather than less satisfactory emission lines which happen to fall in a certain restricted wavelength window.

Another important advantage of the switchboard system described herein is that the problems normally associated with the simultaneous determination of major, minor and trace elements in a single sample can be ameliorated. The presence of intense emission from major analyte species which often results in target blooming in conventional single entrance slit systems may be avoided with the multiple entrance aperture approach through the use of filters 42, selection of different apertures 28 as the working apertures, or by varying the size of the entrance slits 48. Thus the dispersive optical spectrometer of this invention offers many of the individual adjustment features of the direct reading spectrometer with the added advantages of compactness flexibility to monitor different combinations of analytical lines and the ability to monitor background adjacent to a spectral line.

That the input end of the light guides 34 can be moved to different positions relative to the light source to selectively gather particular radiation desired for analysis is an advantage, particularly in that the input to several light guides can be compared. The individual observation height adjustment of each light transmission means is possible thereby reducing the severity of the compromise conditions required for a simultaneous multielement analysis by eliminating observation height as a factor.

The apparatus of this invention as herein described constitutes a new type of optical spectrometer which also may be described as a multiple entrance aperture vidicon spectrometer. The spectrometer is specifically designed to operate with optoelectronic multichannel detectors. Since the optics of the system are extremely simple, economical and reliable operation is readily realized.

While the invention has been particularly shown and described with reference to preferred embodiments thereof, it will be understood by those skilled in the art that the above and other changes in form and details may be made therein without departing from the spirit and scope of the invention.

What is claimed is:

1. In a multiple entrance spectrometer having light detector means, dispersion means for separating light radiation into spectral components and directing said spectral components toward the light detector means, means for admitting light radiation into an entrance focal plane and for directing said light radiation toward said dispersion means, said light radiation admitting means including a plurality of spaced apart apertures, the improvement for providing simultaneous multielement analysis by atomic spectroscopy comprising, a plurality of fiber optic light guides, each of which transmits light radiation from a light source to one of the apertures, said guides having an input end adapted to be positioned adjacent the light source, and said guides having an exit end connected to one of the apertures; said exit ends selectively connected to the apertures for repositioning the exit ends at desired locations in the entrance focal plane for avoiding spectral interferences or regions of intense background on the detector.

2. The apparatus of claim 1 wherein the input ends of the guides include vertically adjustable supports for moving the input ends relative to the light source.

3. The apparatus of claim 1 wherein light guides include a filter for modifying the effect of at least a portion of the light.

4. The apparatus of claim 1 including means connected to the apertures for varying the size of at least one of said apertures.

5. The apparatus of claim 1 wherein the light detector includes an optoelectronic detector coupled to an optical multichannel analyzer.

6. The apparatus of claim 1 including a light collector lens optically fitted to the input end of said light guide for improving the light gathering ability of said light guide.

7. In a multiple entrance spectrometer having light detector means, dispersion means for separating light radiation into spectral components and directing said spectral components toward the light detector means, means for admitting light radiation into an entrance focal plane and for directing said light radiation toward said dispersion means, said light radiation admitting means including a plurality of spaced apart apertures, the improvement for providing simultaneous multielement analysis by atomic spectroscopy comprising,
said light detector means including an optoelectronic detector coupled to an optical multichannel analyzer,
a plurality of fiber optic light guides, each of which transmits light radiation from a light source to one of the apertures, said guides having a vertically movable input end adapted to be positioned adjacent the light source, and said guides having an exit end connected to one of the apertures, said exit ends selectively connected to the apertures for repositioning the inputs for placing desired spectral information in an overlap position in blank regions in the atomic spectrum.

* * * * *